Jan. 25, 1949.                    H. P. STEVENS                    2,459,973
                    ROTARY VALVE INTERNAL-COMBUSTION ENGINE
Filed Nov. 21, 1947                                      8 Sheets-Sheet 2

INVENTOR.
Harry P. Stevens
BY
ATTORNEY.

Jan. 25, 1949.  H. P. STEVENS  2,459,973
ROTARY VALVE INTERNAL-COMBUSTION ENGINE
Filed Nov. 21, 1947  8 Sheets-Sheet 4

INVENTOR.
Harry P. Stevens
BY
ATTORNEY.

Patented Jan. 25, 1949

2,459,973

UNITED STATES PATENT OFFICE 2,459,973

ROTARY VALVE INTERNAL-COMBUSTION ENGINE

Harry P. Stevens, Oyster Bay, N. Y., assignor to The Hasler Stevens Corporation, Mineola, N. Y., a corporation of New York Application November 21, 1947, Serial No. 787,354

1 Claim. (Cl. 123—59)

The invention here disclosed relates to engines of the rotary valve type.

It relates to the same general class of engines as disclosed in prior Patent No. 1,249,235.

One object of the invention is to provide a new arrangement of the valve structure of a multi-cylinder engine, whereby fewer parts are required.

Other objects are to obtain greater rigidity of the valve assembly, simplified construction, improved lubrication and cooling and better starting and throttling characteristics.

The accompanying drawings show by way of illustration a simple form of four-cycle four-cylinder engine where the firing order is 1—3—4—2 and where the two inner cranks throw together and at 180° from the two outer cranks.

The engine consists, in general, of a crank case and a crank shaft, not shown, a cylinder block, an overhead rotary valve shaft and a cover.

In the engine shown, the cylinder block 20 contains adjacent cylinders 1, 2, 3 and 4 in line. The upper ends or heads of these cylinders are extended to form narrow combustion chambers as shown at 21, 22, 23 and 24 in Fig. 5, at 22 and 23 in Fig. 6 and at 23 in Fig. 7.

Figure 6:
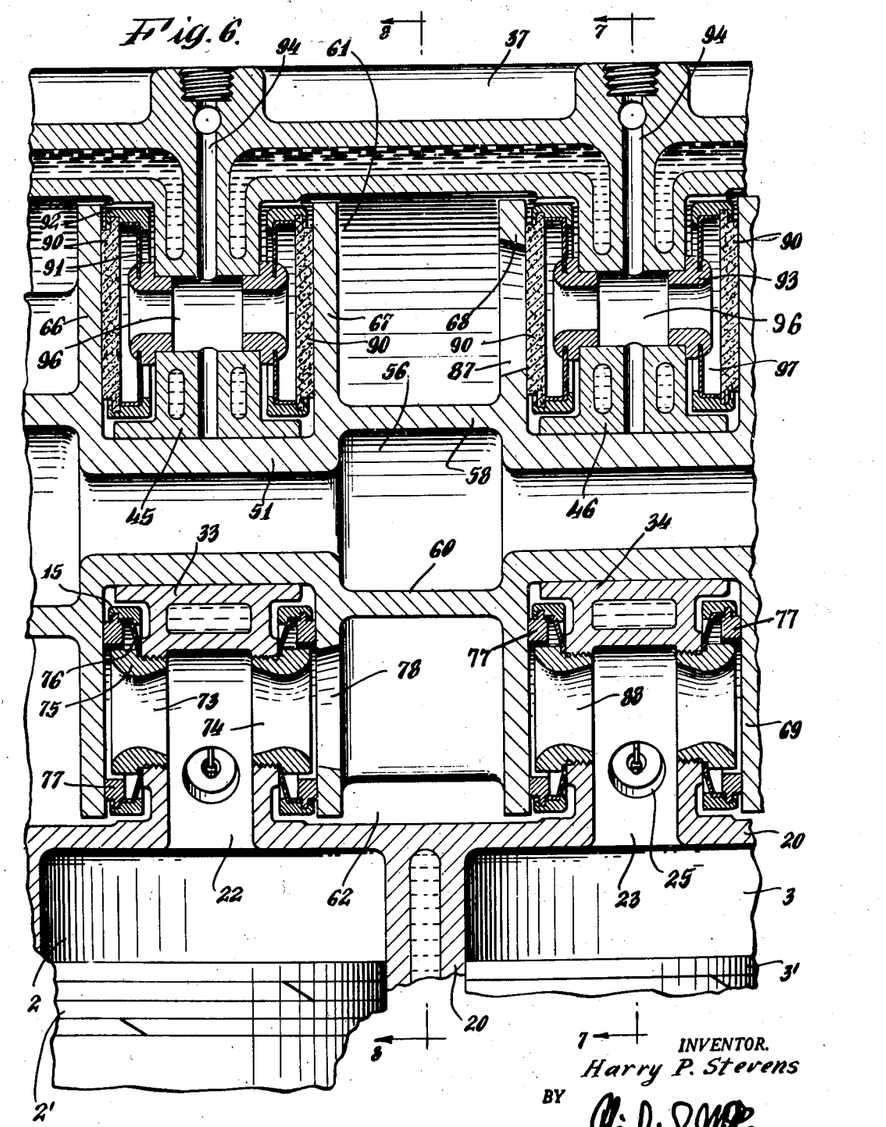
Fig. 6 is an enlarged broken elevation of a part of the cylinder block and cover showing in longitudinal vertical mid-section the tops of the two center cylinders and their related valve assemblies.
Figures 7, 11:
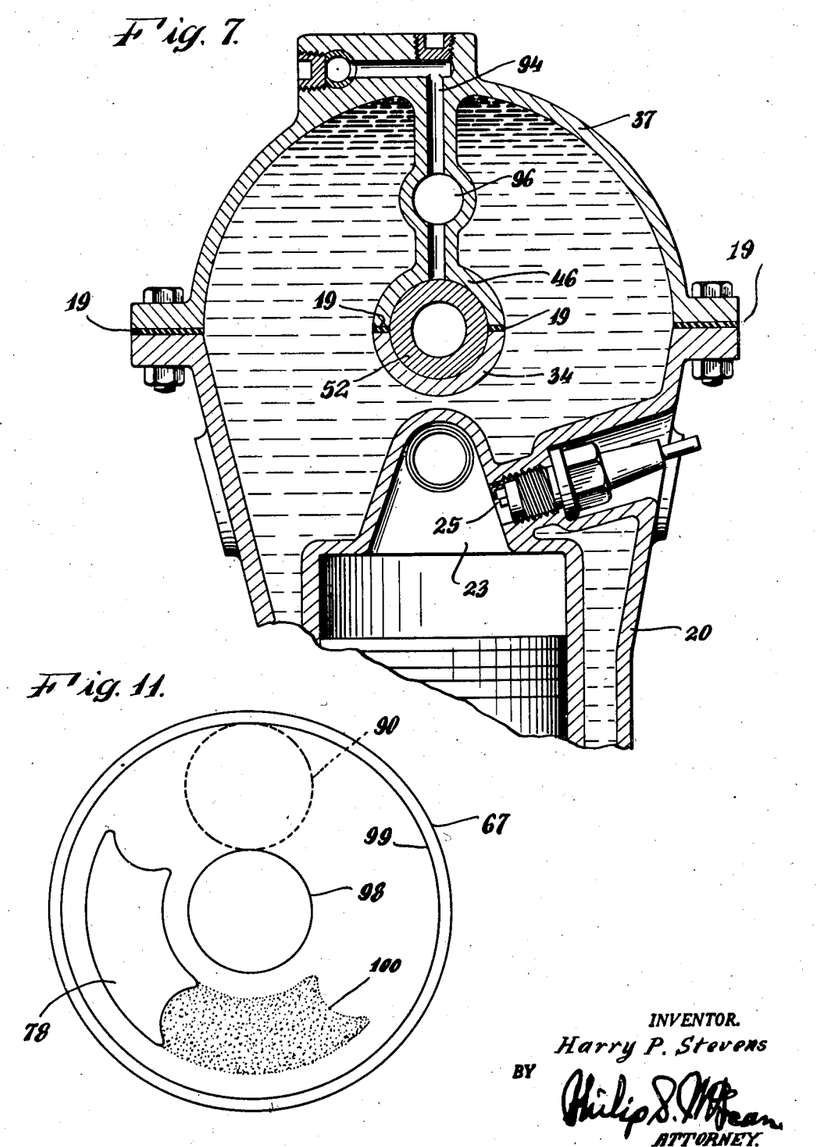
Fig. 7 is a reduced vertical sectional view on the line 7—7 of Fig. 6.
Fig. 11 is a semi-diagrammatic view of one of the disc valves illustrating the position and action of the coacting oiling member.

Each combustion chamber contains a spark plug, such as 25 in combustion chamber 23, as shown in Figs. 6 and 7. It will be noted that each spark plug is located in a plane that extends through the axial line of the cylinder and that the combustion chamber space is symmetrically disposed about the spark gap.

Figure 5:
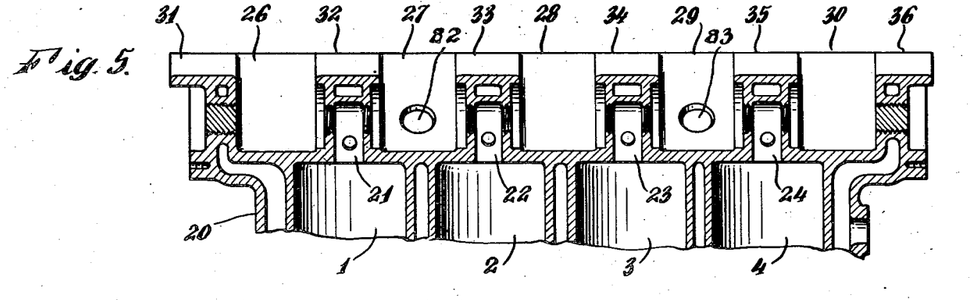
Fig. 5 is a longitudinal vertical sectional view of the upper portion of the cylinder block.

The transverse walls of the combustion chambers 21, 22, 23 and 24 are parallel and the top of the cylinder block is constructed to provide semi-cylindrical recesses 26, 27, 28, 29 and 30, between the combustion chambers. Recess 27 is between combustion chambers 21 and 22, recess 28 between chambers 22 and 23, recess 29 between chambers 23 and 24. Recesses 26 and 30 are beyond chambers 21 and 24, respectively, as shown in Fig. 5.

It will be noted that the walls of these semi-cylindrical recesses are integral with the combustion chamber walls and form continuations thereof. These walls are also integral with half round bearings 31, 32, 33, 34, 35 and 36, as shown in Fig. 5. Shaft bearings 33 and 34 are also shown in section in Fig. 6 and bearing 34 in Fig. 7.

A cylinder block cover 37 is bolted over the top of the cylinder block 20. This cover has semi-cylindrical recesses 38, 39, 40, 41 and 42 which register and mate with the semi-cylindrical recesses 26, 27, 28, 29 and 30, respectively, to complete a series of cylindrical recesses in the top of the cylinder block.

Figure 3:
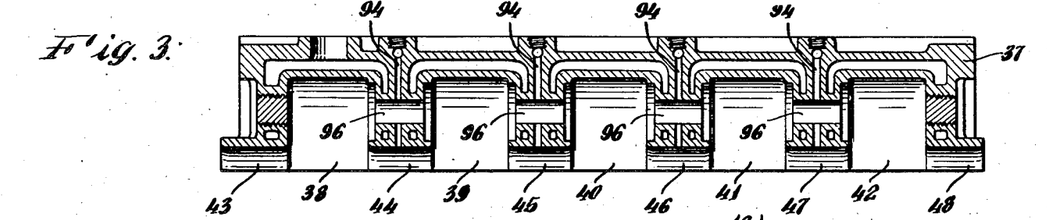
Fig. 3 is a longitudinal vertical mid-section of the cylinder block cover shown in Fig. 1.

The walls of the cylinder cover are integral with half-round bearings 43, 44, 45, 46, 47 and 48, as shown in Fig. 3. Bearings 45 and 46 are shown in section in Fig. 6 and bearing 46 in Fig. 7.

Figure 4:
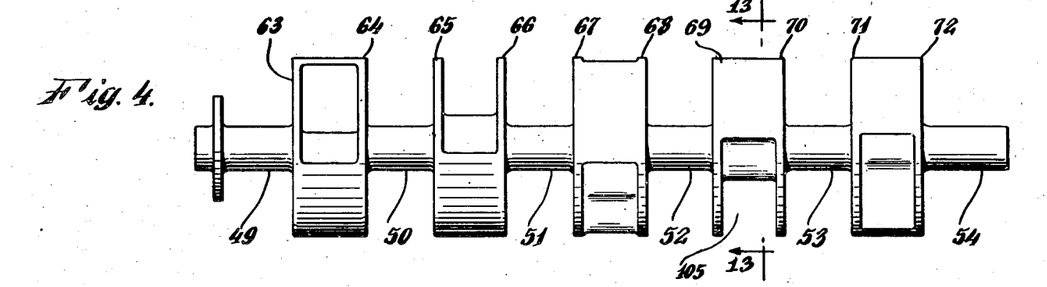
Fig. 4 is a longitudinal elevation of the disc valves and their shaft assembly.

When the cover member 37 is in place on the cylinder block, all the half-round bearings form a row of six complete bearings for the various sections of a valve shaft 49, 50, 51, 52, 53 and 54, as shown in Fig. 4.

The valve shaft sections connect and are integral with five valve cages, as shown in Fig. 4, the whole forming a valve shaft assembly.

This valve shaft assembly rotates between the block and cover. The cages do not contact the walls of the recesses but have a slight clearance. The shaft is driven at one-half engine speed by a bevel gear 16 and pinion 55, the latter driven from the engine crank shaft by other gearing, not shown.

Figure 8:
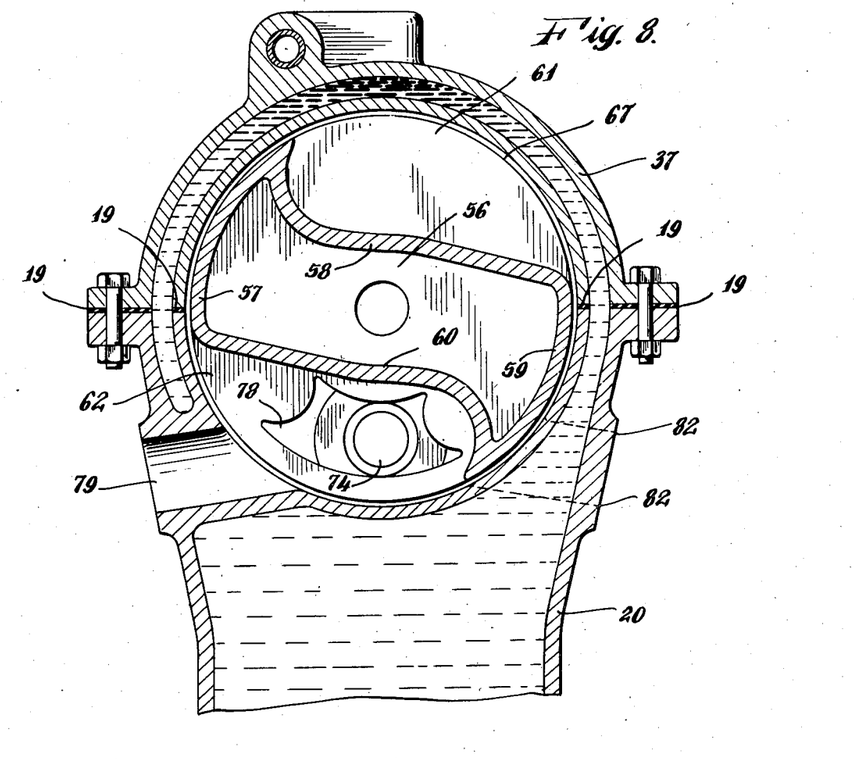
Fig. 8 is a reduced vertical sectional view on the line 8—8 of Fig. 6.
Figures 13, 14, 15:
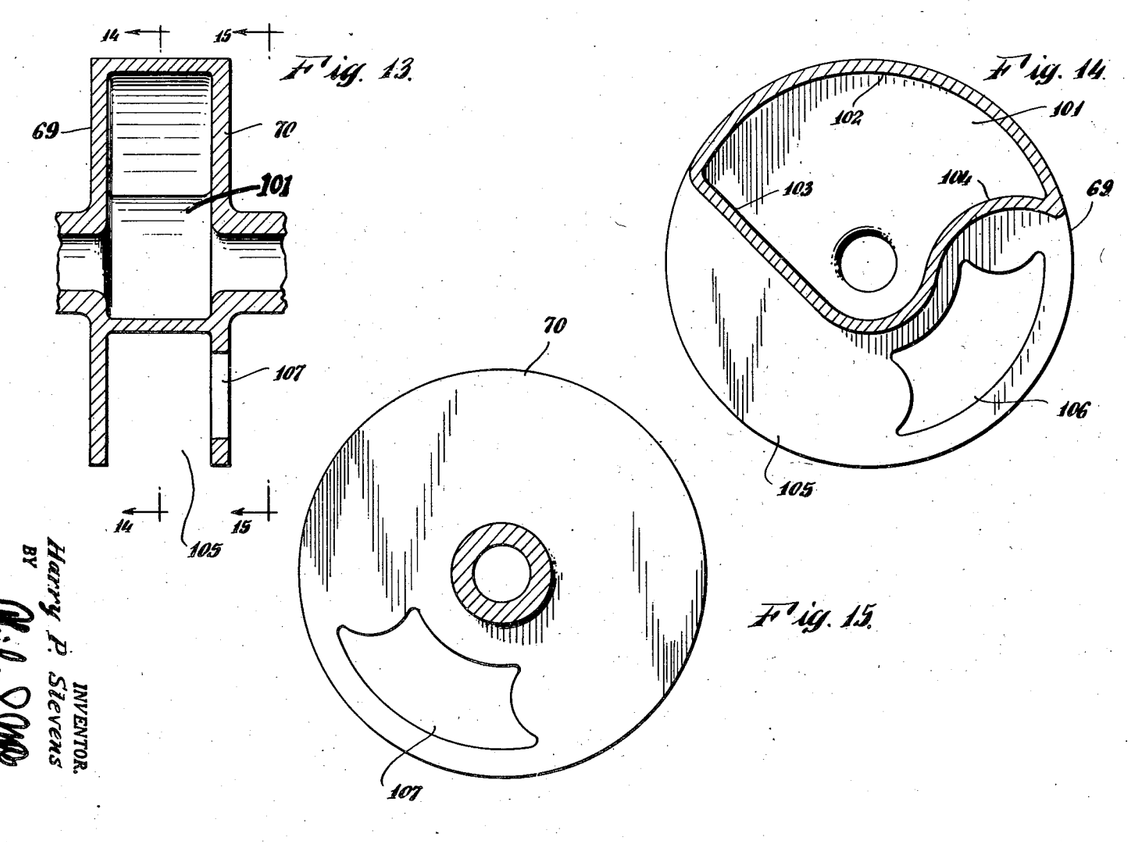
Fig. 13 is a vertical mid-sectional view of one of the inlet valve cages.
Fig. 14 is a section on the line 14—14 of Fig. 13.
Fig. 15 is a section on the line 15—15 of Fig. 13.

Each valve cage consists of a pair of discs connected by a box-like hollow cell such as 56 in Figs. 6 and 8, and 101 in Fig. 14, the sides of which are completely closed. For the purpose of light weight construction the various cells are made hollow and the shaft sections tubular.

Each cell thus forms a box truss preventing torsion of the discs and strengthening them against pressure caused by explosive forces from the combustion chamber. The cross section of each cell, for reasons explained later, takes a peculiar form that adds further to the rigidity and strength of the cage.

Figure 10:
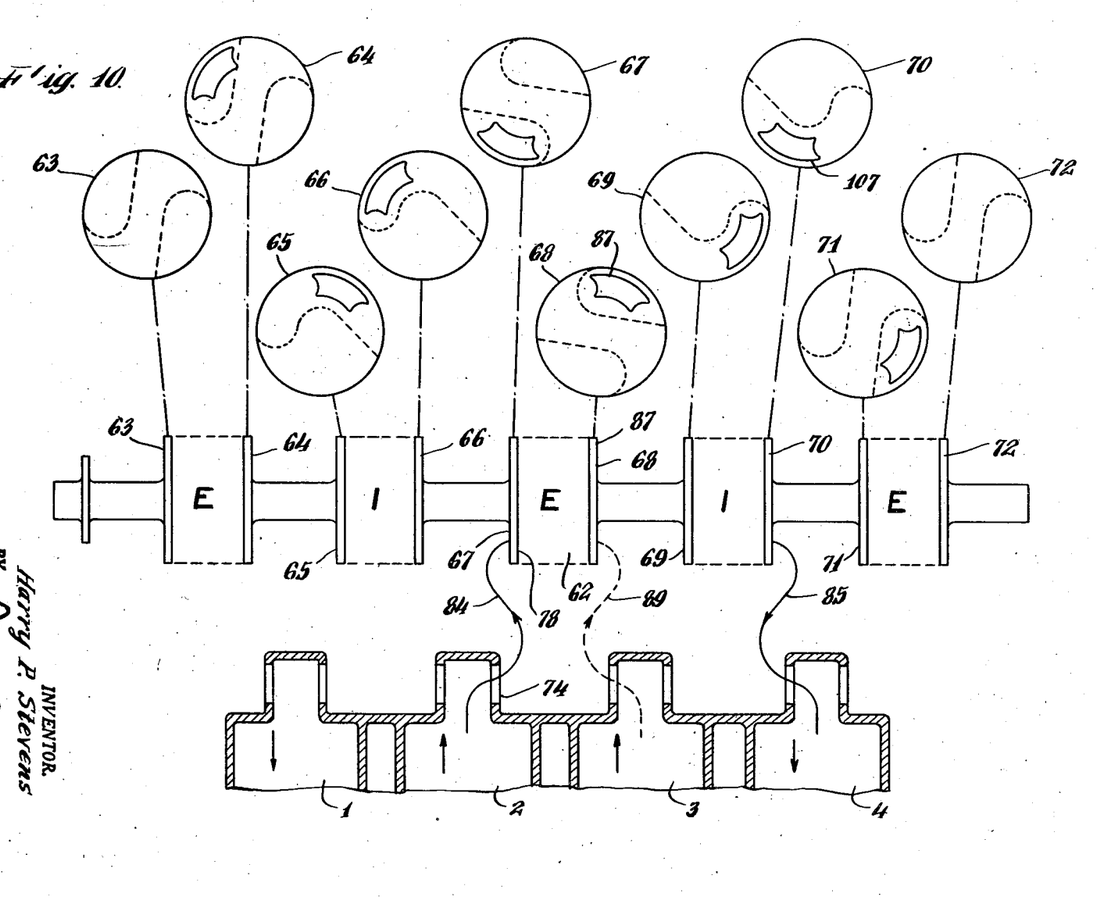
Fig. 10 is a diagram showing the tops or heads of the four cylinders, the valve assemblies therefor and the relative positions of the disc valves which control the timing of the engine.

The discs 63 to 72 inclusive, are shown in Fig. 4. As stated, each valve cage comprises a pair of discs. To simplify the description, I designate each cage by a dual number—that of the two enclosing discs. Thus I designate the center cage as cage 67—68, as shown in Figs. 4, 6 and 10, disc 67 being also shown in Fig. 8.

Between the discs of each cage and outside of the cells is a gas space or channel, such as shown at 61 and 62 in Figs. 6 and 8, and at 105 in Figs. 14 and 4.

Oppositely disposed ports such as 73 and 74 of Fig. 6 are provided in the vertical walls of each combustion chamber and these ports register periodically with openings in the discs that communicate with the above mentioned gas channels in the cages. These channels, in turn, communicate periodically with inlet and exhaust ducts in the cylinder block. Thus, as the cages with their gas channels rotate, the inlet and exhaust gases pass to and from the combustion chambers in their proper sequence.

Each combustion chamber port is provided with a gas-tight packing or seal ring in sliding contact with the adjacent disc. The discs and cylindrical walls of the cages rotate in the block recesses with a slight clearance to avoid friction, and the seal rings are necessary to prevent the escape of gas around the cages.

Any suitable form of packing ring may be used. I illustrate herein one having a bush 75, Fig. 6, screwed into the wall of the combustion chamber 22. A resilient annular diaphragm 76 is attached at its inner periphery to the bush 75, and at its outer edge by means of a containing ring 15, to an anti-friction ring 77 which is in running contact with disc 66. The spring pressure of the diaphragm maintains a gas-tight contact of the ring with the disc.

To more definitely follow the path of the gases through the valve structure, note the center exhaust cage 67—68 as shown in Fig. 6 and disc 67 in Fig. 8. Disc 67 contains the opening 78 that forms communication between gas channels 62 and combustion chamber 22 of cylinder No. 2 through the port 74. This channel 62 also communicates with exhaust duct 79 of the cylinder block 20, as shown in Fig. 8.

Figure 1:
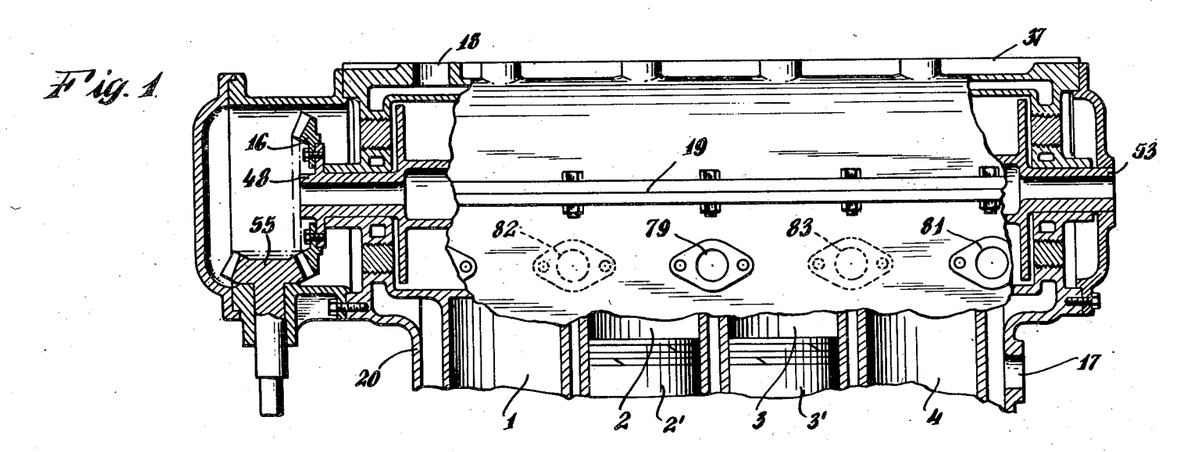
Fig. 1 is a longitudinal elevation, partly broken away and partly in mid-section, showing the upper part of the cylinder block, together with portions of the valve assembly and certain other related parts.
Figure 2:
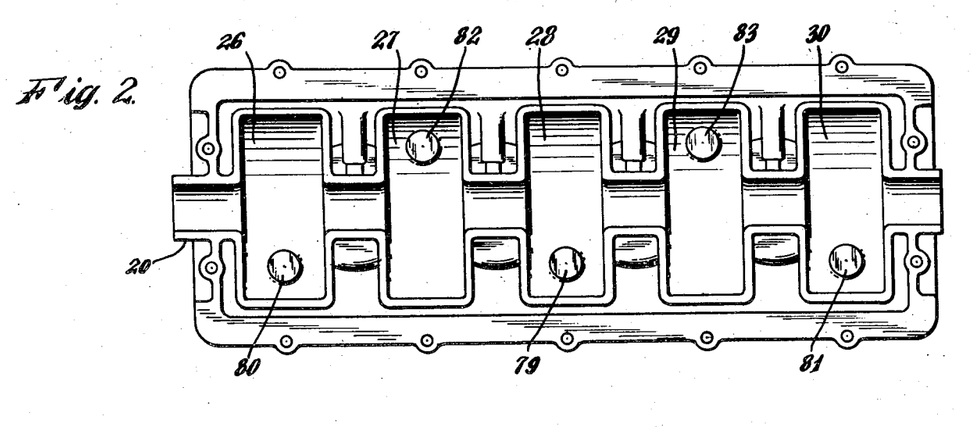
Fig. 2 is a plan view of the top of the cylinder block.

There are three of these exhaust ducts, 80, 79 and 81. There are two inlet ducts 82 and 83 on the other side of the cylinder block, as shown in Figs. 2 and 5 and indicated in dotted lines in Fig. 1. The location of duct 82 is also indicated in Fig. 8 by the dotted lines 82—82.

The diagram, Fig. 10, indicates the parts when in the position shown in Figs. 6 and 8.

The cylinders 1, 2, 3 and 4 are shown, and the arrow heads in the cylinders indicate that the two inner pistons are on their up stroke and the two outer pistons on their down stroke. The several discs are shown in exploded diagrammatic form, turned through 90° to face the reader as viewed from the right. Exhaust and inlet openings are shown on the various discs in their respective angular positions for the proper timing of the engine. The dotted lines on the discs are intended to indicate only the relative angular positions of the cells of the various cages.

In the valve shaft assembly shown in Fig. 10, the three exhaust cages are indicated by the letter "E" and the two inlet cages by the letter "I."

Cylinder No. 1 is on its power stroke, cylinder 2 on its exhaust stroke, cylinder 3 on its compression stroke and cylinder 4 on its intake stroke.

The function of cage 67—68 on the exhaust stroke of cylinder 2 was described above by reference to Figs. 6 and 8. In the diagram, Fig. 10, the path of the exhaust gases is indicated by the full line 84.

In the position shown, cylinder 4 is on its intake stroke, and the path of the intake mixture is indicated on the diagram by the full line 85. The opening 107 on inlet disc 70 is open at that time.

When the valve shaft has turned forward 180° and the crank shaft 360°, cylinder 3 will be on its upward exhaust stroke and in communication with channel 61 of cage 67—68 through the opening 87 of disc 68 and through port 88. Channel 61 will then be open to exhaust duct 79. The path of the exhaust from cylinder 3 at that time is indicated on the diagram by the dotted line 89. It will be seen that cage 67—68 serves as exhaust for cylinders 2 and 3.

The timing of the various discs is such that cage 69—70 serves as inlet for cylinders 3 and 4, cage 65—66 as inlet for cylinders 1 and 2, cage 63—64 as exhaust for cylinder 1, and cage 71—72 as exhaust for cylinder 4. Discs 63 and 72 contain no openings.

It will be seen that the center cage and the two outer cages are used only for exhaust and the two intervening cages only for inlet, as previously stated. The valves are not used alternately for exhaust and inlet. The result of this is that the incoming fuel mixture is always entirely separated from the outgoing exhaust. This avoids contamination of the incoming mixture by the exhaust and provides better starting and throttling characteristics of the engine.

The cooling of the engine is accomplishd by several factors.

Cooling water, indicated in Figs. 6, 7 and 8, circulates in conventional manner in the cylinder block and cover. This water enters the block at the opening 17 and leaves the cover at the opening 18, as shown in Fig. 1. The gasket 19, shown in Figs. 1, 7 and 8, is provided between the cylinder block and cover. This gasket need have sufficient strength to withstand the water pressure only.

It will be noted that on each cylinder two ports face each other across the combustion chamber. The fuel mixture incoming through one port impinges on the opposite port that carries the exhaust. This impingement causes a decided cooling effect on the exhaust valve area.

Another factor that contributes to the cooling of the engine is my method of lubricating the disc valves. I provide a means for applying a film of oil to the discs in the path of the sealing rings. This reduces friction and wear and thus has a cooling effect.

Figure 9:
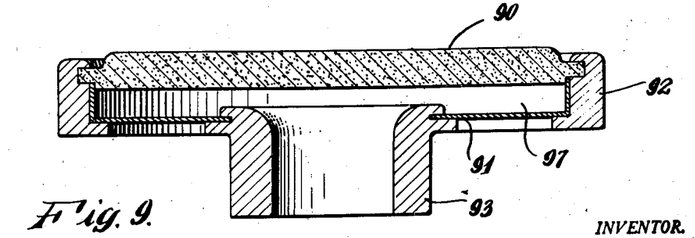
Fig. 9 is an enlarged diametrical section of one of the oiling members shown in Fig. 6.

Oil, however, is not applied in sufficient quantities to cause a smoky exhaust. The application is made by a disc or pad of sintered metal, which is somewhat porous. Four of these pads appear at 90, 90, 90 and 90 in Fig. 6 and one appears in enlarged section in Fig. 9. Each oiling pad is held against its adjacent valve disc by the spring pressure of a resilient diaphragm such as 91 in Figs. 6 and 9. On the outer flange of the diaphragm 91 the oiling pad 90 and an outer ring 92 are assembled by spinning or crimping the outer edge of ring 92.

The inner portion of the diaphragm 91 is spun onto a flanged bush such as 92 in Fig. 6, that is pressed into a cross tube 96, later described, in the cover 37, as shown in Fig. 6.

Cover 37 is provided with oil tubes 94, 94, 94, 94, Figs. 2, 6 and 7. These tubes lead to the shaft bearings in the usual manner and also to double-ended cross tubes 96, 96, 96, 96, Figs. 2, 6 and 7, which feed into bushes 93 and compartments 97, one of each of which is shown in Fig. 6 and in Fig. 9. From these compartments the oil seeps through the porous oiling pads which act both as filters and metering devices. This provides a small but exact amount of oil to the various valve discs at each rotation. This is accomplished without the use of mechanical metering devices or other intricate mechanism.

In Fig. 11 a plan view in diagram form is shown of a disc 67 with its opening 78. The area 100 shows that portion of the disc which is directly exposed to the flame and heat of the burning fuel during the power stroke. An oiling pad, indicated by the dotted line 90, sweeps the space between the circles 98 and 99, including the burned-off area 100, and covers it with a fresh film of oil at every revolution. This lubricates and cools the bronze seal ring that is in running contact with the valve disc. The porous disc thus acts as an oil distributor over a wide area, but at the same time is economical of oil, as it spreads a very thin film. The pad wipes and cleanses the disc as well as lubricates.

Figure 12:
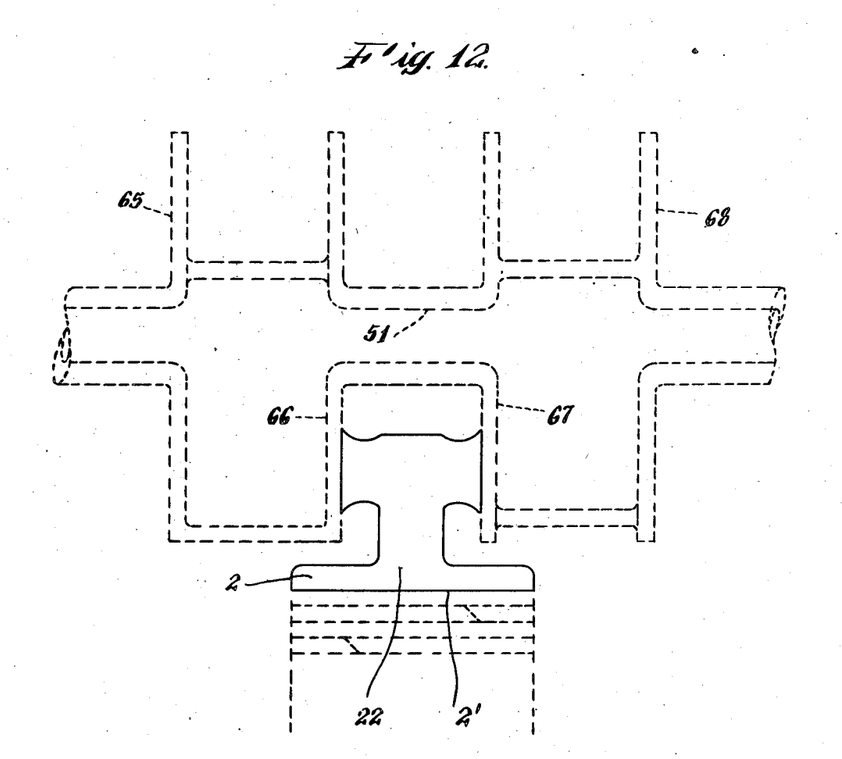
Fig. 12 is a diagram, showing in longitudinal vertical section an outline view of a combustion chamber of one of the cylinders with certain adjacent parts indicated in dotted lines.

Fig. 12 is a diagram to illustrate the action of the explosive pressure in a cylinder, such as 2 in Fig. 6. In the position shown in the diagram the piston 2' is at the top of the power stroke. The full lines show the profile shape of the combustion chamber 22 taken in line with the valve shaft axis and in line with the cylinder diameter. It will be seen that the pressures against the discs 66 and 67 are equal and will balance one another, so that there is no end pressure on the valve assembly nor pressure of the explosive forces on the valve shaft bearings. The two discs are self-sustaining against these forces. Inasmuch as they rotate in their cylinder block recesses with a slight clearance, there is no friction of the parts due to the explosive pressures.

It is evident that the seal contact rings must press on the discs with sufficient force to hold the pressure of the compression stroke and also the much higher pressure of the power stroke. The friction load of the entire valve mechanism, aside from the shaft bearings, is that created by this pressure of the seal rings on the discs and the much lighter pressure of the oiling pads.

It is also evident that the explosive forces tend to spread the discs 66 and 67 apart and that the shaft section 51 and the cages 65—66 and 67—68 must be constructed to withstand this spreading action. The structural shape of the hollow cells in the valve cages is of decided advantage in providing the required rigidity of the discs.

The two inlet cages 65—66 and 69—70 are constructed similarly. Fig. 13 shows a vertical mid-sectional view of the cage 69—70 on the same scale as the view of the exhaust cage shown in Fig. 8. It is also an enlarged section on the line 13—13 of Fig. 4.

These inlet cages are lubricated in the same manner as above described for the exhaust cages. They differ somewhat, however, in their internal construction from that of the exhaust cages.

It will be seen from Fig. 14 that the cell 101 is formed by the walls 102, 103 and 104, and that the shape of this cell is different from the shape of cell 56 of the exhaust cage 67—68 shown in Fig. 8. The cell 101 provides for only one gas space or channel 105, due to the fact that the openings 106 and 107 in the discs 69 and 70, respectively, are in a close circumferential relation to one another. This is caused by the sequence of the timing and firing operations of the various cylinders.

Both inlet and exhaust cages, however, have one feature in common in that the walls of the cells curve to a partial extent around the openings in the discs that form one of the sides of the cages. In Fig. 8 it will be seen that the wall 60 extends entirely across the inner face of disc 67 and curves around the opening 78.

This deflects the exhaust gas from the port 74 to the duct 79 and confines it as much as possible to its proper path. In this manner unnecessary diffusion of exhaust gas in the clearance space around the cage is prevented and the heating of the engine is reduced.

In Fig. 14 it is seen that the wall 104 is curved around the opening 106. This serves to confine the incoming fuel mixture to its proper path and to avoid any unnecessary turbulence of this fuel in the channel 105. This feature improves the throttling characteristics of the engine at low speeds.

It will thus be seen that both the exhaust and inlet cages have passages that facilitate the flow of gases, and also are of such shape as to improve the strength and rigidity of the discs, as before described.

The four cylinder engine above described is chosen for illustration only. The principles of my invention may be equally applied to engines with any number of cylinders, whether of spark ignition or Diesel type, and for stationary, marine, automotive or aircraft use.

The construction of the engine with semi-cylindrical recesses 26, 27, 28, 29 and 30 at the ends and between adjoining cylinders, is highly desirable as providing ample working space and clearance for the mounting and adjusting of the valve sealing rings 77. This will be particularly clear from Fig. 5.

The joining of the valve discs in pairs serving adjoining cylinders, such as 65—66, 67—68, 69—70, Fig. 4, with integral cells such as 56, Figs. 6 and 8, and 101, Figs. 13 and 14, in addition to connecting and stiffening the valve structure, provides a continuous passage through the valve shaft which, as indicated in Fig. 1, may be utilized for circulation purposes to afford ample cooling of the valve discs, connecting cells and shaft portions 49, 50, etc. The outer walls of these cells, such as 58 and 60, Figs. 6 and 8, may be shaped as indicated to best accommodate and take care of the gas flow between cylinder ports and engine passages.

The complementary semi-cylindrical recesses 38, 39, 40, 41 and 42 in the cover structure, provide, as shown in Fig. 3, proper accommodation for the valve lubricating and cooling pads 90, facilitating proper mounting and adjustment of these pads to best cooperate with the valve discs, as shown in Fig. 6.

Figs. 3, 4 and 5 also illustrate the convenience of working on the cylinder head, the valve assembly or the cover each as an independent unit, and the ease of assembly after parts have been properly mounted and adjusted. As an example, the valve ports 73, 74 of Fig. 6 may be easily screwed into position in the opposing upright walls of the combustion chambers such as 22, 23, etc., and then after all these are in place, the valve assembly may be lowered in its bearings and tested for proper cooperation of the sealing rings 77. Adjustments, if necessary, can be readily made to effect proper sliding engagement of the sealing rings with all the valve discs.

Similarly the lubricating pads 90 may be mounted in the cover block and tests made to insure or to enable necessary adjustments such that when the cover block is finally lowered over the valve assembly, all valves will be properly sealed and lubricated.

The valve discs may turn at approximately three-quarter piston speed so that the rubbing effect of the lubricating pads will have a definite scouring and cleaning as well as lubricating and cooling effect on the valve discs. This continual cleaning of the valve discs is important in keeping the engine in the most efficient operating condition, avoiding carbon formation, pitting and other troubles.

The valve cages operating with clearance in the cylindrical chambers provided by the cylinder block and cover structures, together with the fact that pressure in each cylinder is balanced equally against valve discs in adjoining cages, assures free running operation of the valve assembly without imposing binding or frictional losses at any point.

I claim:

An internal combustion engine comprising a cylinder block having cylinders in line, with combustion chambers at the ends of the cylinders and semi-cylindrical recesses between the combustion chambers of adjoining cylinders, a cover for said cylinder block having semi-cylindrical recesses in line with said semi-cylindrical recesses in the cylinder block and forming therewith cylindrical valve chambers, a rotary valve assembly journaled between said cylinder block and cover and having valve cages disposed to rotate in said cylindrical valve chambers, said combustion chambers of adjoining cylinders having ports both opening into the same cylindrical valve chamber and said valve chambers having ducts for the inlet and exhaust functions of the engine and said valve cages including parallel valve discs integrally connected by hollow cells extending diametrically across between the connected discs and having externally curved walls shaped to form segmental channels between the discs in line with said inlet and exhaust ducts and the valve discs having ports therethrough to register with said combustion chamber ports and opening into said segmental channels provided by the hollow cells between said valve discs.

HARRY P. STEVENS.

REFERENCES CITED

The following references are of record in the file of this patent:

UNITED STATES PATENTS

| Number | Name | Date |
|---|---|---|
| 1,662,908 | Stevens | Mar. 20, 1928 |
| 1,740,758 | White | Nov. 28, 1928 |
| 1,792,991 | Lehman | Feb. 17, 1931 |
| 1,924,188 | Hall | Aug. 29, 1933 |
| 2,319,733 | Hall | May 18, 1943 |

FOREIGN PATENTS

| Number | Country | Date |
|---|---|---|
| 452,086 | France | Feb. 28, 1913 |